(12) United States Patent
Nam et al.

(10) Patent No.: US 11,462,725 B2
(45) Date of Patent: Oct. 4, 2022

(54) CATHODE ACTIVE MATERIAL FOR LITHIUM SECONDARY BATTERY

(71) Applicants: POSCO, Pohang-si (KR); RESEARCH INSTITUTE OF INDUSTRIAL SCIENCE & TECHNOLOGY, Pohang-si (KR)

(72) Inventors: Sang Cheol Nam, Seoul (KR); Sang Hyuk Lee, Incheon (KR)

(73) Assignees: POSCO, Pohang-si (KR); RESEARCH INSTITUTE OF INDUSTRIAL SCIENCE & TECHNOLOGY, Pohang-si (KR)

( * ) Notice: Subject to any disclaimer, the term of this patent is extended or adjusted under 35 U.S.C. 154(b) by 19 days.

(21) Appl. No.: 16/473,083

(22) PCT Filed: Dec. 8, 2017

(86) PCT No.: PCT/KR2017/014402
§ 371 (c)(1),
(2) Date: Jun. 24, 2019

(87) PCT Pub. No.: WO2018/117506
PCT Pub. Date: Jun. 28, 2018

(65) Prior Publication Data
US 2019/0341598 A1 Nov. 7, 2019

(30) Foreign Application Priority Data
Dec. 22, 2016 (KR) .................. 10-2016-0177040

(51) Int. Cl.
*H01M 4/64* (2006.01)
*H01M 4/131* (2010.01)
(Continued)

(52) U.S. Cl.
CPC ............ *H01M 4/131* (2013.01); *C01G 53/00* (2013.01); *H01M 4/134* (2013.01); *H01M 4/525* (2013.01);
(Continued)

(58) Field of Classification Search
CPC ...... H01M 4/131; H01M 4/134; H01M 4/525; H01M 4/52; H01M 10/0525; H01M 10/052; H01M 2004/028
See application file for complete search history.

(56) References Cited

U.S. PATENT DOCUMENTS 9,947,916 B2 * 4/2018 Oda ..................... H01M 4/505
2006/0154146 A1 7/2006 Kawasato et al.
(Continued)

FOREIGN PATENT DOCUMENTS

CN 102844914 A 12/2012
CN 103000880 A 3/2013
(Continued)

OTHER PUBLICATIONS

Extended European Search Report dated Nov. 28, 2019 issued in European Patent Application No. 17883842.1.
(Continued)

*Primary Examiner* — Raymond Alejandro
(74) *Attorney, Agent, or Firm* — Morgan, Lewis & Bockius LLP

(57) ABSTRACT

A cathode active material for a lithium secondary battery includes a nickel-based lithium metal oxide particle doped with Zr and Al. The nickel-based lithium metal oxide particle includes a core portion having a constant molar content of nickel, and a shell portion surrounding an outer surface of the core portion and having a concentration gradient in which a molar content of nickel gradually decreases in a direction from an interface with the core
(Continued)

portion to an outermost periphery. The core portion and the shell portion are doped with Al and Zr.

19 Claims, 10 Drawing Sheets

(51) Int. Cl.
    *C01G 53/00*     (2006.01)
    *H01M 4/134*     (2010.01)
    *H01M 4/525*     (2010.01)
    *H01M 10/0525*     (2010.01)
    *H01M 4/02*     (2006.01)

(52) U.S. Cl.
    CPC .. *H01M 10/0525* (2013.01); *H01M 2004/028* (2013.01)

(56) References Cited

U.S. PATENT DOCUMENTS

| | | |
|---|---|---|
| 2015/0194662 A1 | 7/2015 | Yang et al. |
| 2016/0172674 A1* | 6/2016 | Oda .................. H01M 4/505 429/223 |
| 2020/0119342 A1* | 4/2020 | Watanabe .............. H01M 4/52 |

FOREIGN PATENT DOCUMENTS

| | | |
|---|---|---|
| CN | 104521039 A | 4/2015 |
| CN | 104904043 A | 9/2015 |
| CN | 105009333 A | 10/2015 |
| CN | 105742582 A | 7/2016 |
| CN | 106165181 A | 11/2016 |
| EP | 2602849 A2 | 6/2013 |
| JP | 2005-285720 A | 10/2005 |
| JP | 2006-228651 A | 8/2006 |
| JP | 2006-278196 A | 10/2006 |
| JP | WO 2005/106993 A1 | 3/2008 |
| JP | 2011-076891 A | 4/2011 |
| JP | 2012-230898 A | 11/2012 |
| KR | 10-0822012 B1 | 4/2008 |
| KR | 10-2014-0018628 A | 2/2014 |
| KR | 10-2014-0082189 A | 7/2014 |
| KR | 10-2014-0085347 A | 7/2014 |
| KR | 10-2014-0099218 A | 8/2014 |
| KR | 10-2014-0130067 A | 11/2014 |
| KR | 10-2014-0142171 A | 12/2014 |
| KR | 10-2015-0080390 A | 7/2015 |
| KR | 10-2016-0032787 A | 3/2016 |
| KR | 10-2016-0043531 A | 4/2016 |
| KR | 10-2016-0045029 A | 4/2016 |
| KR | 10-2016-0080618 A | 7/2016 |
| KR | 10-2018-0018628 A | 2/2018 |
| WO | WO 2011/99494 * | 8/2011 ............ H01M 4/525 |
| WO | 2015/132647 A1 | 9/2015 |
| WO | 2015/156399 A1 | 10/2015 |
| WO | 2015/198521 A1 | 12/2015 |
| WO | 2016/175597 A1 | 11/2016 |

OTHER PUBLICATIONS

Korean Notice of Allowance dated Jul. 2, 2019 issued in Korean Patent Application No. 10-2018-7001915.
International Search Report and Written Opinion issued in International Application No. PCT/KR2017/014402 dated Apr. 16, 2018, with English translation of search report.
Japanese Office Action dated Jul. 28, 2020 issued in Japanese Patent Application No. 2019-534732.
Japanese Decision on Grant dated Oct. 19, 2021 issued in Japanese Patent Application No. 2019-534732.
Chinese Office Action dated Sep. 15, 2021 issued in Chinese Patent Application No. 201780080331.2.

* cited by examiner

[Fig. 1a]
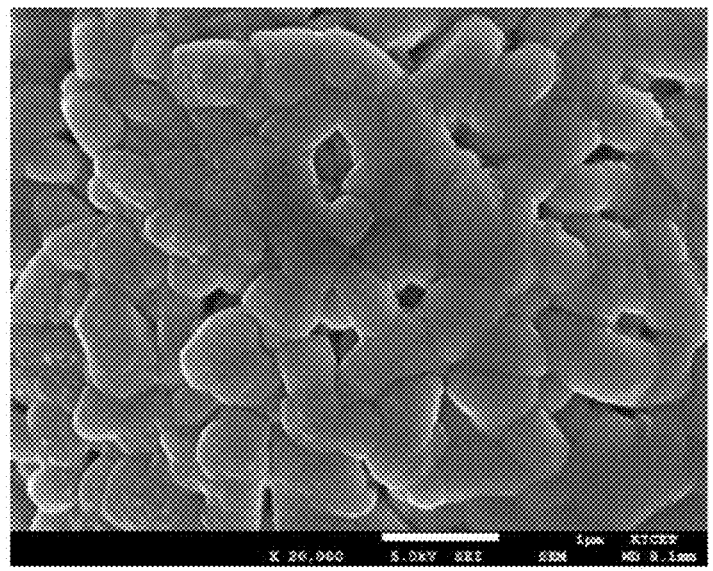
[Fig. 1b]
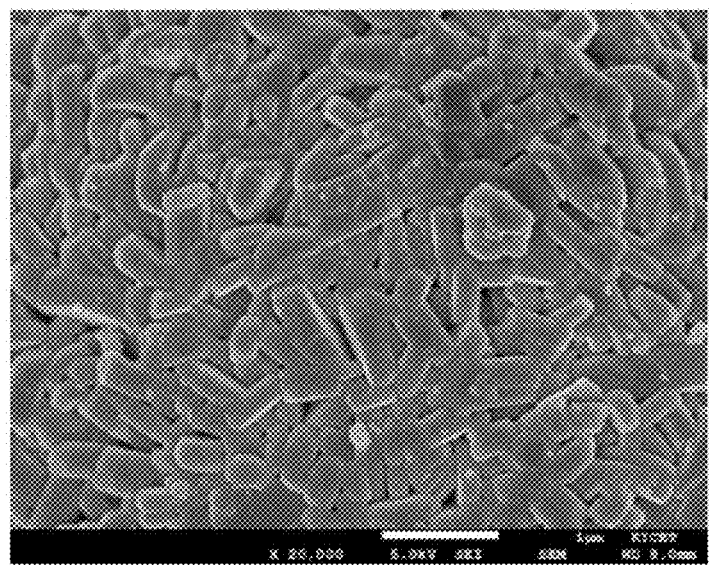

[Fig. 1c]
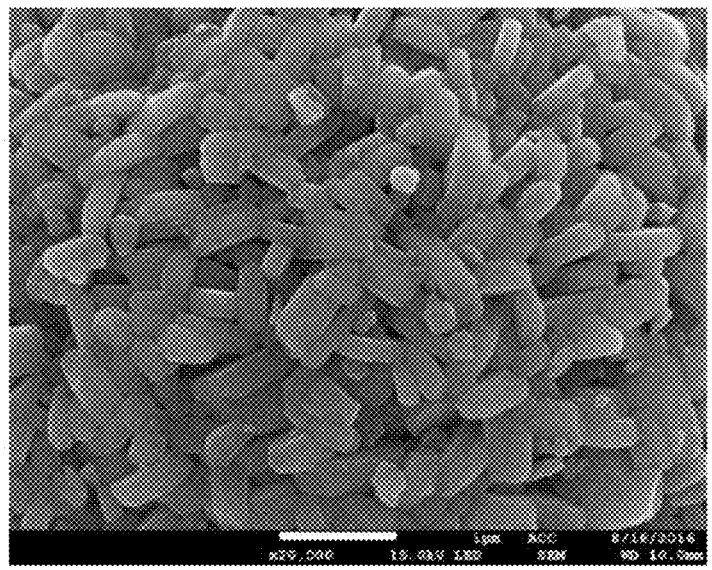
[Fig. 2a]
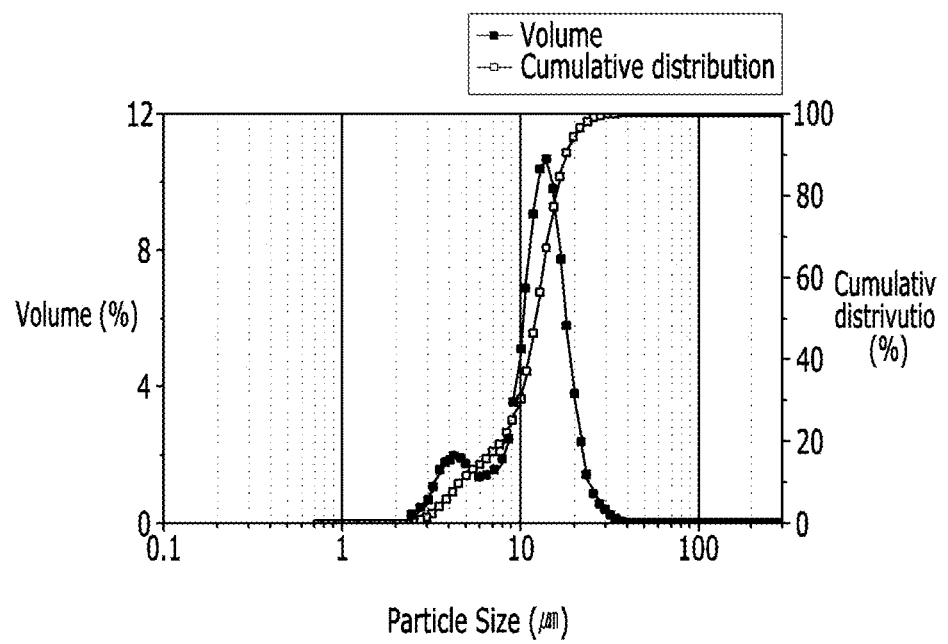

[Fig. 2b]
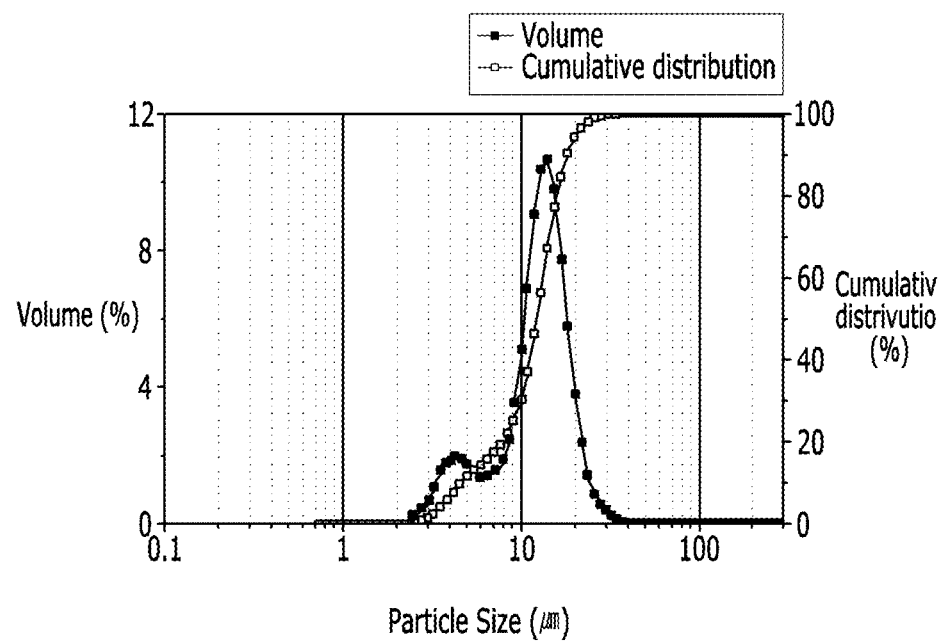

[Fig. 2c]
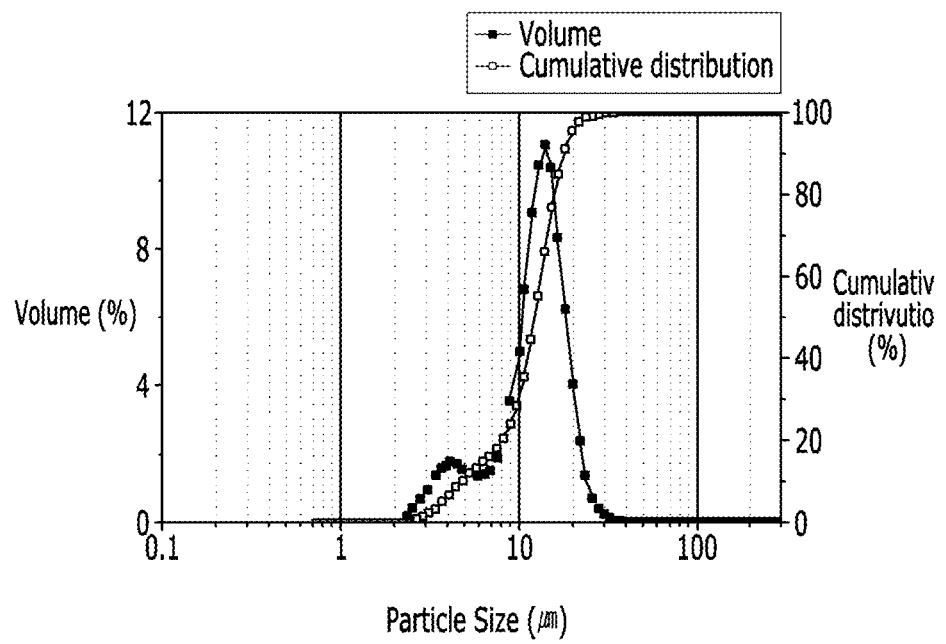

[Fig. 3]
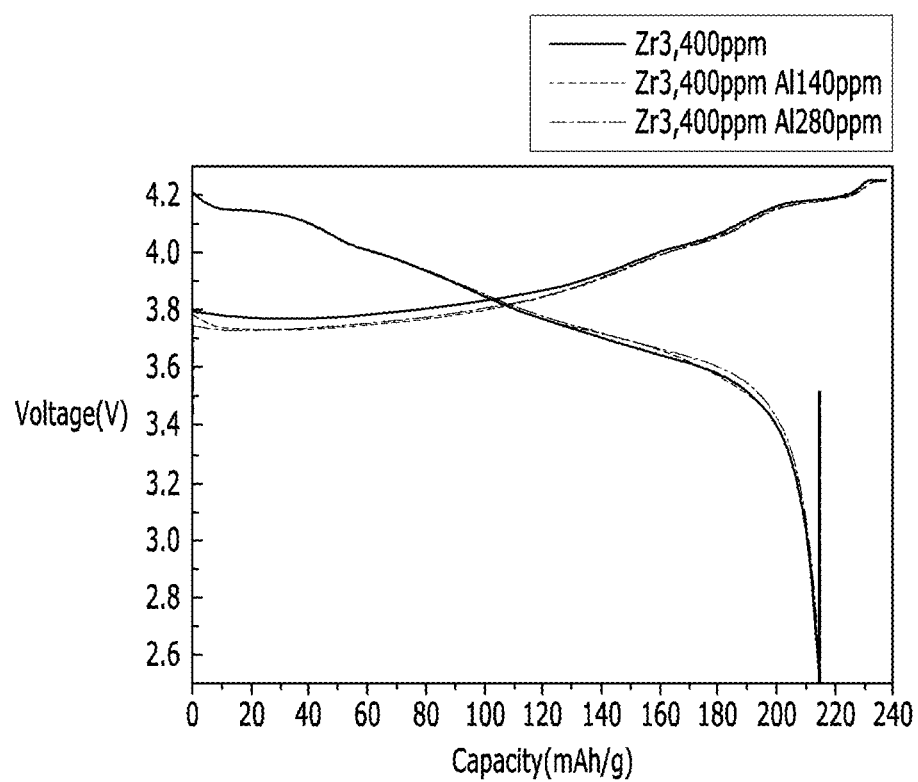

[Fig. 4]
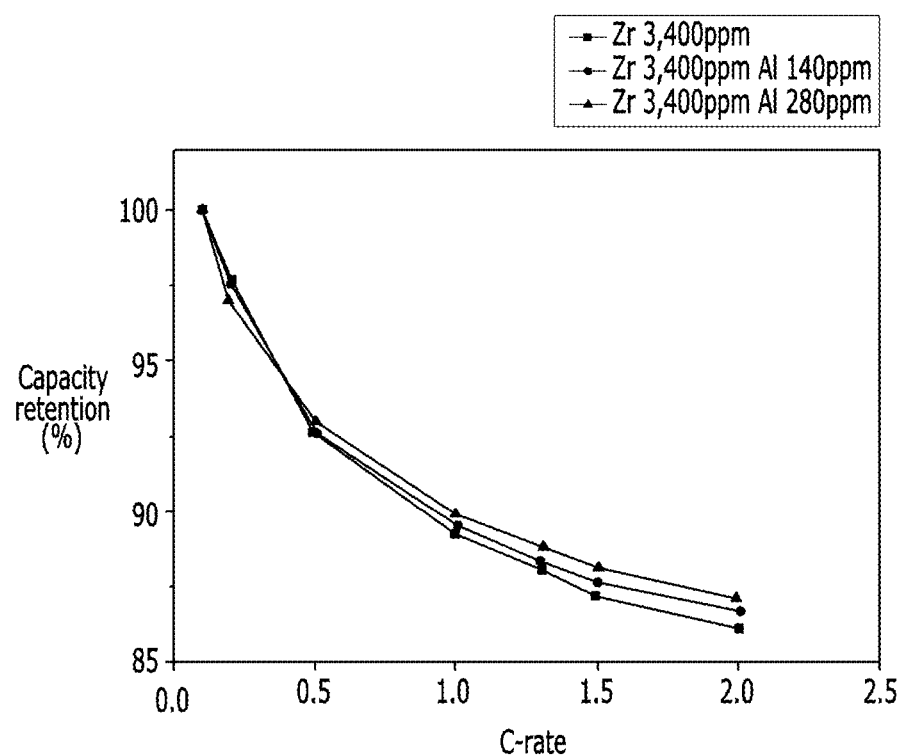

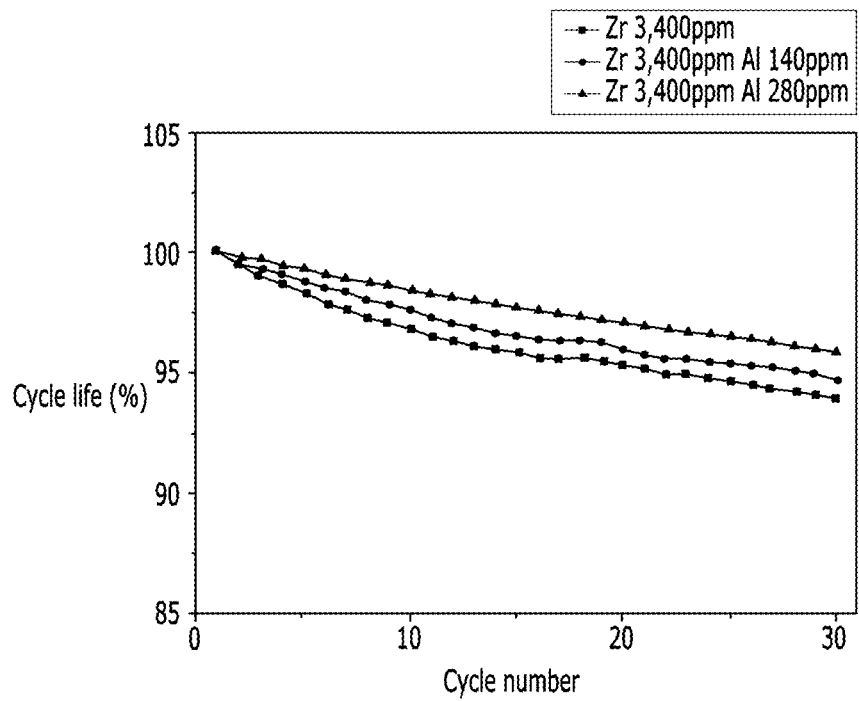
[Fig. 5]

[Fig. 6]
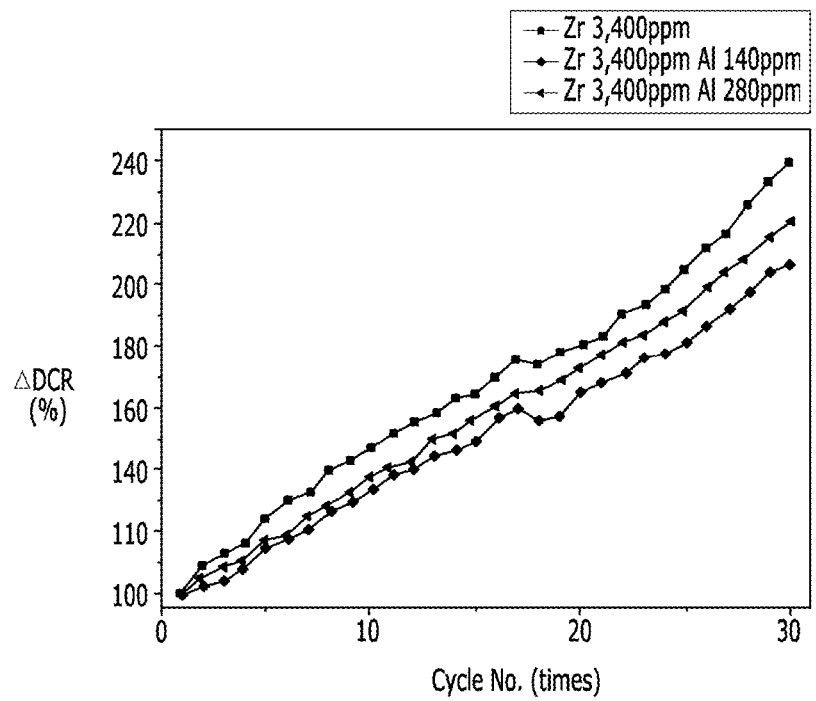

[Fig. 7]
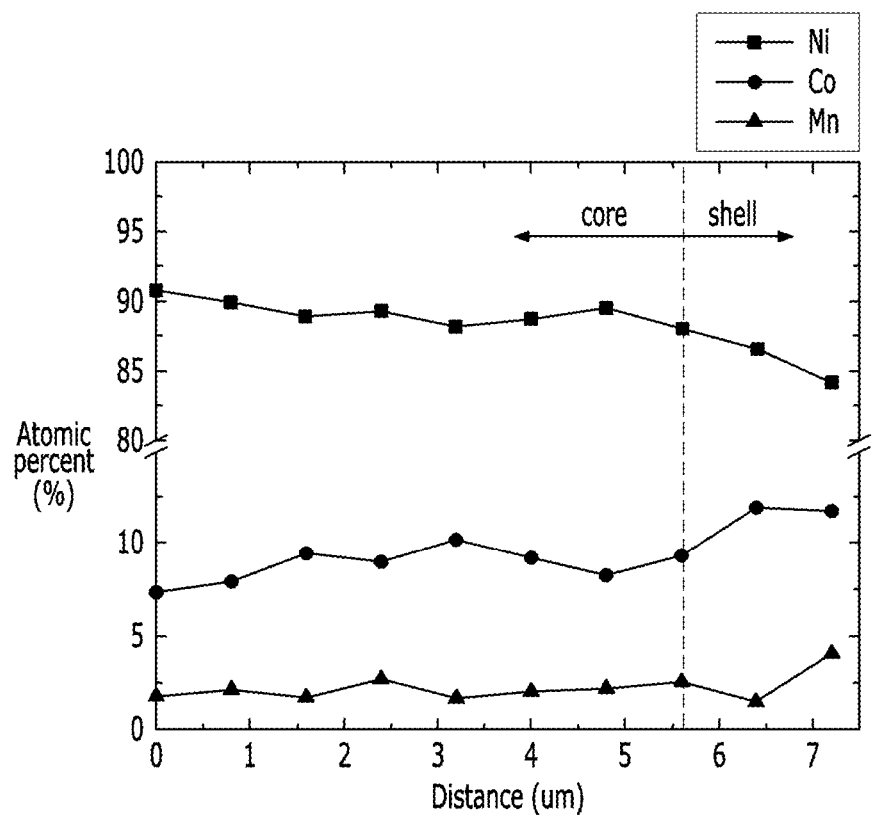

[Fig. 8]
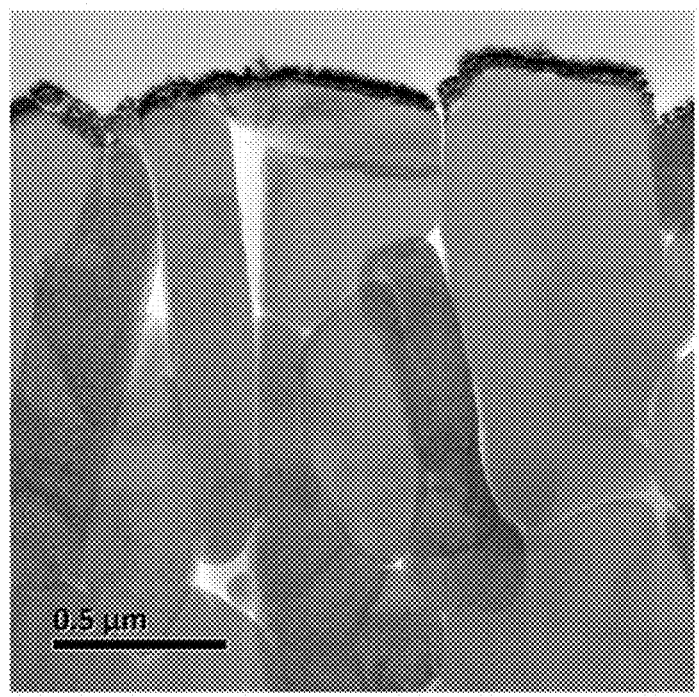

CATHODE ACTIVE MATERIAL FOR LITHIUM SECONDARY BATTERY

CROSS REFERENCE

This application is the U.S. National Phase under 35 U.S.C. § 371 of International Application No. PCT/KR2017/014402 filed on Dec. 8, 2017, which claims the benefit of Korean Application No. 10-2016-0177040 filed on Dec. 22, 2016, the entire contents of each are hereby incorporated by reference.

TECHNICAL FIELD

A cathode active material, a method for producing the same, and a lithium secondary battery comprising the same is disclosed.

BACKGROUND

The cathode active material, which is one of the constituent elements of the lithium secondary battery, not only directly contributes to the manifestation of the energy density of the battery, but also determines the lifetime characteristics and the like.

In this connection, studies on nickel-based lithium metal oxides having a layered structure such as so-called NCM have been actively carried out, and as the content of nickel (Ni) increases, a high capacity can be exhibited.

However, there is a problem that the nickel-based lithium metal oxide becomes structurally unstable as the content of nickel (Ni) increases.

On the other hand, the nickel-based lithium metal oxide has a problem in that it is sensitive to the temperature at which the nickel-based metal hydroxide, which is a precursor thereof, and the lithium supply material are mixed and sintered. Specifically, the output characteristic of the nickel-based lithium metal oxide obtained at a high sintering temperature is low, and the capacity of the nickel-based lithium metal oxide obtained at a low sintering temperature is low. This is related to the tendency that the higher the sintering temperature, the larger the crystal size of the nickel-based lithium metal oxide and the larger the particle size of the primary particles.

DETAILED DESCRIPTION

Technical Problem

The cathode active material, which is one of the constituent elements of the lithium secondary battery, not only directly contributes to the manifestation of the energy density of the battery, but also determines the lifetime characteristics and the like.

In this connection, studies on nickel-based lithium metal oxides having a layered structure such as so-called NCM have been actively carried out, and as the content of nickel (Ni) increases, a high capacity can be exhibited.

However, there is a problem that the nickel-based lithium metal oxide becomes structurally unstable as the content of nickel (Ni) increases.

On the other hand, the nickel-based lithium metal oxide has a problem in that it is sensitive to the temperature at which the nickel-based metal hydroxide, which is a precursor thereof, and the lithium supply material are mixed and sintered. Specifically, the output characteristic of the nickel-based lithium metal oxide obtained at a high sintering temperature is low, and the capacity of the nickel-based lithium metal oxide obtained at a low sintering temperature is low. This is related to the tendency that the higher the sintering temperature, the larger the crystal size of the nickel-based lithium metal oxide and the larger the particle size of the primary particles.

Technical Solution

In one embodiment of the present invention, there is provided a cathode active material for a lithium secondary battery comprising nickel-based lithium metal oxide particles doped with Zr and Al.

Specifically, the nickel-based lithium metal oxide particle includes a core portion in which a molar amount of nickel is constant; and a shell portion surrounding the outer surface of the core portion and having a concentration gradient in which the molar amount of nickel gradually decreases in a direction from the interface with the core portion to the outermost periphery.

A molar ratio of Zr:Al in the nickel-based lithium metal oxide particle may be 15:1 to 0.4:1, for example 10:1 to 2:1. The doping amount of Zr in the nickel-based lithium metal oxide particle may be 2,000 to 5,000 ppm, and may be 2,000 to 4,000 ppm, specifically 2,200 to 3,800 ppm. The doping amount of Al may be 100 to 1,500 ppm, 100 to 500 ppm, specifically 120 to 320 ppm.

The nickel-based lithium metal oxide particle may have a primary particle shape in the form of a rod. For example, the nickel-based lithium metal oxide particle is a large-particle having a D50 diameter of 10 to 30 μm, and has a lattice parameter of a axis from 2.85 to 2.88 Å, or 2.86 to 2.88 Å. Also, that has a lattice parameter of c axis from 14.13 to 14.37 Å or 14.17 to 14.34 Å. In addition, the nickel-based lithium metal oxide particle has a crystallite size of 60 nm to 200 nm or 80 to 120 nm.

The nickel-based lithium metal oxide particle may have a value of 50% or more, specifically 75% or more, of the following equation 3.

$$R2/(R2+D2)*100\% \quad \text{[Equation 3]}$$

In the equation 3, R2 is the radius of the core portion in the nickel-based metal oxide particle, and D2 is the thickness of the shell portion in the nickel-based metal oxide particle.

The average composition of the nickel-based lithium metal oxide particles may be represented by the following formula 4.

$$Li_m[Ni_{1-w4-x4-y4-z4}Co_{w4}M1_{x4}M2_{y4}M3_{z4}]_nO_{2-p4}X_{p4} \quad \text{[Formula 4]}$$

in the formula 4, M1 is selected from the group consisting of Mn, Mg, Sn, Ca, Ge, Ga, B, Mo, and Nb, M2 is Zr, M3 is Al, X is selected from the group consisting of F, N, and P, w4, x4, y4, z4, and p4 is respectively, $0<w4\leq0.2$, $0<x4\leq0.2$, $0<y4\leq0.006$, $0<z4\leq0.006$, $0<w4+x4+y4+z4\leq0.4$, and $0\leq p4\leq0.1$, m is $0.95\leq m\leq1.1$, n is $0.95\leq n\leq1.1$, and m/n is 0.98 to 1.05.

For example, it may be $0<y4\leq0.0044$, $0.0004\leq z4\leq0.002$, and p4=0.

The core portion composition of the nickel-based lithium metal oxide particles may be represented by the following formula 5 in the entire region.

$$Li_m[Ni_{1-w5-x5-y5-z5}Co_{w5}M1_{x5}M2_{y5}M3_{z5}]_nO_{2-p5}X_{p5} \quad \text{[Formula 5]}$$

In the formula 5,

M1 is selected from the group consisting of Mn, Mg, Sn, Ca, Ge, Ga, B, Mo, and Nb, M2 is Zr, M3 is Al, X is selected from the group consisting of F, N, and P, w5, x5, y5, z5, and p5 is respectively, $0 \leq w5 \leq 0.1$, $0 \leq x5 \leq 0.1$, $0 < y5 \leq 0.005$, $0 < z5 \leq 0.006$, $0 \leq w5+x5+y5+z5 \leq 0.2$, and $0 \leq p5 \leq 0.1$, m is $0.95 \leq m \leq 1.1$, and n is $0.95 \leq n \leq 1.1$.

For example, it may be $0 < y5 \leq 0.004$, $0 < z5 \leq 0.002$, and p5=0.

The shell portion of the nickel-based lithium metal oxide particle is represented by the following formula 5 at the interface, and the following formula 6 at the outermost periphery, and a molar content of Ni, M1, M2, and M3 is gradually changed from the interface to the outermost periphery.

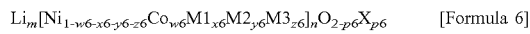   [Formula 6]

in the formula 6,

M1 is selected from the group consisting of Mn, Mg, Sn, Ca, Ge, Ga, B, Mo, and Nb, M2 is Zr, M3 is Al, X is selected from the group of F, N, and P, w6, x6, y6, z6, and p6 is respectively, $0 < w6 \leq 0.3$, $0 < x6 \leq 0.3$, $0 < y6 \leq 0.007$, $0 < z6 \leq 0.006$, $0 < w6+x6+y6+z6 \leq 0.5$, and $0 \leq p6 \leq 0.1$, m is $0.95 \leq m \leq 1.1$, and n is $0.95 \leq n \leq 1.1$.

For example, it may be $0 < y6 \leq 0.0065$, $0 < z6 \leq 0.002$, and p6=0. A coating layer which surrounds the outer surface of the shell portion and contains at least one of an element which is B, Mg, Zr, Al, Mn, Co or a combination thereof, an oxide of the element, an amorphous compound, a lithium ion conductive oxide and polymer, may be further included.

The nickel-based lithium metal oxide particles are plural and a mixture of two kinds of the nickel-based lithium metal oxide particles having different particle diameters.

The mixture can include a large-particle having a D50 diameter of 10 to 30 μm; and a small-particle having a D50 particle size of 1 to 6 μm.

The weight ratio of the large-particles:the small-particles may be in the range of 50:50 to 90:10.

According to another embodiment of the present invention, there is provided a method for producing cathode active material for lithium secondary battery, comprising:

preparing a first metal salt aqueous solution and a second metal salt aqueous solution each containing a nickel source material, a dissimilar metal source material, and water, and the molar concentrations of the nickel source material being different from each other;

a first coprecipitation step of supplying the first metal salt aqueous solution at a constant rate to a reactor in which the pH is kept constant and the chelating agent is supplied;

a second coprecipitation step of gradually decreasing the supply rate of the first metal salt aqueous solution and gradually increasing the supply rate of the second metal salt aqueous solution after the first coprecipitation step;

obtaining nickel-based metal hydroxide particle in the second coprecipitation step; and obtaining nickel-based lithium metal oxide particle doped with Zr and Al by sintering a mixture of the nickel-based metal hydroxide particle, a lithium source material, a Zr supply material, and a Al supply material after the second coprecipitation step.

Wherein the weight ratio of the Zr supply material:the Al supply material in the mixture of the nickel-based metal hydroxide particle, the lithium source material, the Zr supply material, and the Al supply material may be controlled from 25:1 to 12:1 or 15:1 to 0.4:1.

The first coprecipitation step and the second coprecipitation step may be controlled so that the value of the following equation 1 for the obtained nickel-based metal hydroxide particle is not less than 50%:

$$R1/(R1+D1)*100\%$$  [Equation 1]

In the above equation 1,

R1 is the radius of a core portion in the nickel-based metal hydroxide particle, and D1 is the thickness of a shell portion in the nickel-based metal hydroxide particle.

The first coprecipitation step and the second coprecipitation step may be controlled so as to satisfy the following equation 2:

$$\log(T1)/\log(T1+T2) \approx R1/(R1+D1)$$  [Equation 2]

In the above equation 2, T1 is the execution time of the first coprecipitation step, and T2 is the execution time of the second coprecipitation step.

The step of obtaining nickel-based lithium metal oxide particle doped with Zr and Al by sintering a mixture of the nickel-based metal hydroxide particle, a lithium source material, a Zr supply material, and a Al supply material after the second coprecipitation step comprises:

a first sintering step of sintering in a temperature range of 400 to 600° C.; a temperature raising step of raising the temperature at a rate of 3 to 7° C./min; and a second sintering step of sintering in a temperature range of 700 to 800° C.

A step of forming a coating layer surrounding the outer surface of the nickel-based lithium metal oxide particle may be further included, after the step of obtaining the nickel-based lithium metal oxide particle, The step of forming a coating layer surrounding the outer surface of the nickel-based lithium metal oxide particle can include:

mixing the nickel-based lithium metal oxide particle and a coating source material; and heating the mixture of the nickel-based lithium metal oxide particle and the coating source material.

In another embodiment of the present invention, there is provided a cathode including a cathode active material for a lithium secondary battery as described above; anode; and an electrolyte.

Effect

The cathode active material provided in one embodiment of the present invention is capable of high capacity and structure stabilization by appropriately controlling the CGS-type concentration gradient of the nickel-based lithium metal oxide particles.

Further, by simultaneous doping of Zr and Al in the nickel-based lithium metal oxide particles having the CGS-type concentration gradient, the crystal size can be controlled to an appropriate range and the shape and size of the primary particles can be controlled. Accordingly, improvement of the output characteristics and life characteristics of the battery and minimization of the DCR resistance increase rate at the time of the high-temperature charge/discharge cycle can be achieved.

BRIEF DESCRIPTION OF DRAWINGS

FIGS. 1a, 1b, and 1c are SEM images of the surface of a cathode active material by internal doping element and doping amount, respectively. [FIG. 1a is Zr 3,400 ppm, FIG. 1b is Zr 3,400 ppm+Al 140 ppm, FIG. 1c is Zr 3,400 ppm+Al 280 ppm]

FIGS. 2a, 2b, and 2c are graphs showing the particle size distribution (PSD) for a bi-modal cathode active material mixed with large diameter particles and small particle size particles (large diameter:small particle size=8:2 by weight ratio). [FIG. 2A shows Zr 3,400 ppm, FIG. 2B shows Zr 3,400 ppm Al 140 ppm, and FIG. 2C shows Zr 3,400 ppm Al 280 ppm]

FIG. 3 compares the initial charging/discharging curves of the batteries for each cathode active material with different amounts of Al doping based on Zr doping.

FIG. 4 compares the output characteristics of a battery with respect to each of the cathode active materials having different amounts of Al doping based on Zr doping.

FIG. 5 compares the high temperature (45° C.) lifetime characteristics of the battery with respect to each of the cathode active materials having different amounts of Al doping based on Zr doping.

FIG. 6 compares the high temperature (45° C.) cycle DCR increase rate of a battery with respect to each cathode active material with different amounts of Al doping based on Zr doping.

FIG. 7 shows the results of measurement of the metal concentration distribution of the core portion and the shell portion of the large-particle prepared by simultaneously doping 3,400 ppm of Zr and 140 ppm of Al in Example 1.

FIG. 8 is a TEM image of a shell portion of a large-particle prepared by doping 3,400 ppm of Zr and 140 ppm of Al simultaneously in Example 1.

MODE FOR INVENTION

Hereinafter, embodiments of the present invention will be described in detail. However, it should be understood that the present invention is not limited thereto, and the present invention is only defined by the scope of the following claims.

Further, in the present specification, with respect to the particle size,

D0.9 means particle size when the particles are accumulated up to 0.9% by volume in small particle order in present of various particle sizes, for example 0.1, 0.2, 0.3 . . . 3, 5, 7 . . . 10, 20, 30 μm. D10 is the particle size when the particles are accumulated up to 10% by volume, D50 is the particle size when the particles are accumulated up to 50% Size, D6 particle size means particle size when particles are accumulated up to 6% by volume ratio, and D95 means particle size when particles are accumulated up to 95% by volume.

Cathode Active Material

In one embodiment of the present invention, there is provided a cathode active material for a lithium secondary battery comprising nickel-based lithium metal oxide particles doped with Zr and Al.

Specifically, the nickel-based lithium metal oxide particle includes a core portion in which a molar amount of nickel is constant; and a shell portion surrounding the outer surface of the core portion and having a concentration gradient in which the molar amount of nickel gradually decreases in a direction from the interface with the core portion to the outermost periphery.

As mentioned above, there is a problem that the nickel-based lithium metal oxide becomes structurally unstable as the content of nickel (Ni) increases.

However, the cathode active material provided in one embodiment of the present invention includes nickel-based lithium metal oxide particles having a CSG form, which is advantageous for stabilizing the structure.

Specifically, the CSG type has a core-shell gradient (hereinafter referred to as "CSG") in which a high concentration of nickel is constantly maintained in the core portion and a concentration of nickel is decreased in the shell portion.

Therefore, while the molar content of nickel in the core portion is kept high, the molar content of nickel in the shell portion is decreased, so that high capability is achieved. Also, the molar content of the different metals (e.g., Mn, Co, Al, etc.) is increased in the shell portion, so that the structure can be stable.

Furthermore, the nickel-based lithium metal oxide particles having the CSG shape may have a rod shape in which the primary particle shape is similar to a rectangular parallelepiped due to the change concentration of metal in the shell portion.

In the case of having such a primary particle form, there is an advantage that the a-plane of the crystal structure is directed to the surface portion, and the Li ion moves easily between the electrolyte and the cathode active material. Ion conductivity and electrical conductivity are high, which is advantageous for improving the initial efficiency and life characteristics of the battery.

On the other hand, as pointed out above, the nickel-based lithium metal oxide has a problem that the crystal size changes according to the temperature at which the precursor is sintered. Accordingly, the primary particle characteristics (shape, size, etc.) may be changed.

However, the cathode active material provided in one embodiment of the present invention includes the nickel-based lithium metal oxide particles having the CSG shape and simultaneously doped with Zr and Al, and then the crystal size and the primary particle characteristics can be controlled appropriately.

Specifically, as evidenced by the evaluation example described later, the nickel-based lithium metal oxide particles having the CSG shape and simultaneously doped with Zr and Al have an appropriate range of crystal sizes, improvement of the output characteristics and life characteristics of the battery In addition, it has a minimization of the rate of increase of the DCR resistance at the time of the high-temperature charge/discharge cycle.

In addition, the nickel-based lithium metal oxide particles may have a uniform internal composition (i.e., CSG type and doping amount) by particle size. Thus, it is advantageous to mix the two kinds of nickel-based lithium metal oxide particles having different particle sizes at a certain ratio to increase the energy density of the cathode.

This is because, by a so-called bi-modal technique, the gap between large-sized particles (hereinafter referred to as "large-particles") is filled by small-sized particles (Hereinafter referred to as "small-particle"), so that a large amount of cathode active material can be accumulated within a unit volume.

Hereinafter, the cathode active material provided in one embodiment of the present invention will be described in more detail.

Doping Amount

As described above, in the cathode active material provided in one embodiment of the present invention, the crystal size of the nickel-based lithium metal oxide particles having the CSG shape is controlled to an appropriate range through simultaneous doping of Zr and Al, and the shape and size of the primary particles can be controlled. As a result, it is possible to improve the output characteristics and lifetime characteristics of the battery, and minimize the increase rate of DCR resistance during a high-temperature charge/discharge cycle.

Specifically, the molar ratio of Zr:Al in the nickel-based lithium metal oxide particle may be 15:1 to 0.4:1, for example, 10:1 to 2:1. As the doping amount of Al doped with Zr in the above range is increased, particles having a reduced crystal size are obtained at the same sintering temperature, whereby the primary particle size of the active material is decreased and its shape is more clearly controlled.

More specifically, the doping amount of Zr in the nickel-based lithium metal oxide particle may be 2,000 to 5,000 ppm, and may be 2,000 to 4,000 ppm, specifically, 2,200 to 3,800 ppm. In addition, the doping amount of Al doped therewith may be 100 to 1,500 ppm, 100 to 500 ppm, specifically 120 to 320 ppm.

Primary Particle Shape and Crystal Size

The nickel-based lithium metal oxide particles may have a primary particle shape in the form of a rod. That is, the aspect ratio, which is the ratio of the major axis to the minor axis of the primary particles (long axis/short axis), is 1 or more. Specifically, for example, among the nickel-based lithium metal oxide particles, a large-particle having a D50 particle diameter of 10 to 30 μm has an a-axis crystal lattice parameter of 2.85 to 2.88 Å, and the c-axis lattice parameter may be 14.13 to 14.37 Å, for example, 14.17 to 14.34 Å, and the Crystalline size may be 60 nm to 200 nm, for example, 80 nm to 120 nm. However, when Zr alone is doped into the nickel metal lithium oxide oxide particles in a large-particle, it is possible to have the a-axis and c-axis lattice parameters in the above range. That is, with respect to nickel-based lithium metal oxide particles of large diameter, when Zr and Al are co-doped, there is no significant change in the a-axis and c-axis lattice parameters compared with the case where Zr is doped alone.

However, when Zr and Al are co-doped with nickel metal oxide particles having a large particle size, there is a large change in the crystallite size as compared with the case where Zr alone is doped, as described above. Specifically, when the Zr and Al are co-doped with nickel metal oxide particles having a large particle size, the crystal size may be 60 to 200 nm, specifically 80 to 120 nm and 80 to 100 nm. The crystal size in the case of Zr singly doped may be more than 100 nm. This fact is supported by the evaluation examples described later.

Bi-Modal

On the other hand, the nickel-based lithium metal oxide particles are plural and may be a mixture of two kinds of the nickel-based lithium metal oxide particles having different particle diameters.

This is a mixture of the nickel-based lithium metal oxide particles having the same CSG shape and doping characteristics but having different particle diameters. Therefore, the pores between the large-diameter particles can be filled with the small-particle size particles, and a large amount of the cathode active material can be accumulated within the unit volume. Therefore, it is advantageous to increase the energy density of the anode.

Specifically, the mixture can have a large-particle having a D50 particle size of 10 to 30 μm, more specifically, 10 to 18 μm; and a small-particle having a D50 particle size of 1 to 6 μm.

In this case, the weight ratio of the large-particles to the small-particles may be in the range of 50:50 to 90:10.

When a large-particle having a D50 particle size satisfies the above-described range and a small-particle having a D50 particle size satisfying the above-described range are mixed in the weight ratio range, the capacity of the lithium secondary battery to which the cathode active material according to this embodiment is applied can be further improved.

Composition

The nickel-based lithium metal oxide particles may have a uniform internal composition (i.e., CSG type and doping amount) by particle size. Therefore, it is advantageous to realize the bimodal active material described above.

The nickel-based lithium metal oxide particles may have a value of the following equation 3 of 50% or more and 90% or less, specifically 75% or more and 85% or less, by the particle size.

When the value of the following equation 3 is less than 50%, it is necessary to secure an average Ni concentration for securing the charge and discharge capacity of the secondary battery to which such nickel-based lithium metal oxide particles are applied. As a result, the Ni concentration of the shell portion in the cathode active material is inevitably increased, so that the thermal stability of the cathode active material is remarkably reduced.

$$R2/(R2+D2)*100\%$$ [Equation 3]

In the Equation 3, R2 is the radius of the core portion in the nickel-based metal oxide particle, and D2 is the thickness of the shell portion in the nickel-based metal oxide particle.

The average composition of the nickel-based lithium metal oxide particles may be represented by the following Formula 4 for each particle size.

$$Li_m[Ni_{1-w4-x4-y4-z4}Co_{w4}M1_{x4}M2_{y4}M3_{z4}]_nO_{2-p4}X_{p4}$$ [Formula 4]

In the formula 4, M1 is selected from the group consisting of Mn, Mg, Sn, Ca, Ge, Ga, B, Mo, and Nb, M2 is Zr, M3 is Al, X is selected from the group consisting of F, N, and P, w4, x4, y4, z4, and p4 is respectively, $0<w4\leq0.2$, $0<x4\leq0.2$, $0<y4\leq0.006$, $0<z4\leq0.006$, $0<w4+x4+y4+z4\leq0.4$, and $0\leq p4\leq0.1$, m is $0.95\leq m\leq1.1$, n is $0.95\leq n\leq1.1$.

For example, it may be $0<y4\leq0.0044$, $0.0004\leq z4\leq0.002$, and p4=0. The core portion composition of the nickel-based lithium metal oxide particles may be represented by the following formula 5 in the entire region.

$$Li_m[Ni_{1-w5-x5-y5-z5}Co_{w5}M1_{x5}M2_{y5}M3_{z5}]_nO_{2-p5}X_{p5}$$ [Formula 5]

In the formula 5, M1 is selected from the group consisting of Mn, Mg, Sn, Ca, Ge, Ga, B, Mo, and Nb, M2 is Zr, M3 is Al, X is selected from the group consisting of F, N, and P, w5, x5, y5, z5, and p5 is respectively, $0\leq w5\leq0.1$, $0\leq x5\leq0.1$, $0<y5\leq0.005$, $0<z5\leq0.006$, $0\leq w5+x5+y5+z5\leq0.2$, and $0\leq p5\leq0.1$, m is $0.95\leq m\leq1.1$, and n is $0.95\leq n\leq1.1$.

For example, it may be $0<y5\leq0.004$, $0<z5\leq0.002$, and p5=0.

The shell portion of the nickel-based lithium metal oxide particle is represented by the following formula 5 at the interface, and the following formula 6 at the outermost periphery, and a molar content of Ni, M1, M2, and M3 is gradually changed from the interface to the outermost periphery.

$$Li_m[Ni_{1-w6-x6-y6-z6}Co_{w6}M1_{x6}M2_{y6}M3_{z6}]_nO_{2-p6}X_{p6}$$ [Formula 6]

In the formula 6, M1 is selected from the group consisting of Mn, Mg, Sn, Ca, Ge, Ga, B, Mo, and Nb, M2 is Zr, M3 is Al, X is selected from the group of F, N, and P, w6, x6, y6, z6, and p6 is respectively, $0<w6\leq0.3$, $0<x6\leq0.3$, $0<y6\leq0.007$, $0<z6\leq0.006$, $0<w6+x6+y6+z6\leq0.5$, and $0\leq p6\leq0.1$, m is $0.95\leq m\leq1.1$, and n is $0.95\leq n\leq1.1$.

For example, it may be $0<y6\leq0.0065$, $0<z6\leq0.002$, and p6=0.

The nickel-based lithium metal oxide particles may have a stable structure according to the composition of the shell part of the formula 6 while exhibiting a high capacity according to the total composition of the formula 4 and the composition of the core part of the formula 5.

In addition, the nickel-based metal oxide particles constituting the cathode active material of the present embodiment may have a molar content of nickel of 80% or more at the interface between the core portion and the shell portion and a molar content of nickel of 70% or more at the outermost portion of the shell portion. Further, the nickel content of the shell portion may have a concentration gradient gradually decreasing from the interface to the outermost portion. More specifically, the nickel molar content at the interface of the core portion and the shell portion may be 80% to 99%, or 85% to 98%. Also, the outermost portion of the shell, i. E., the nickel mole content at the surface, can be at least 70%, from 70% to 92% or from 80% to 90%.

In addition, in the nickel-based metal oxide particles, metals other than nickel (i.e., M1, M2, and M3) may have a concentration gradient such that the molar content gradually increases from the interface to the outermost periphery.

Coating Layer

The cathode active material may include a coating layer which is surrounded the outer surface of the shell portion and includes an elements of B, Mg, Zr, Al, Mn, Co or a combination thereof, an oxide of the element, an amorphous compound, a lithium ion conductive oxide (for example, lithium borate, lithium borosilicate), a polymer, and the like.

In this case, the direct contact between the nickel-based lithium metal oxide particles and the electrolyte and the side reaction thereof can be suppressed by the substance contained in the coating layer.

Method for Producing Cathode Active Material

According to another embodiment of the present invention, there is provided a method for producing cathode active material for lithium secondary battery, comprising:

preparing a first metal salt aqueous solution and a second metal salt aqueous solution each containing a nickel source material, a dissimilar metal source material, and water, and the molar concentrations of the nickel source material being different from each other;

a first coprecipitation step of supplying the first metal salt aqueous solution at a constant rate to a reactor in which the pH is kept constant and the chelating agent is supplied;

a second coprecipitation step of gradually decreasing the supply rate of the first metal salt aqueous solution and gradually increasing the supply rate of the second metal salt aqueous solution after the first coprecipitation step;

obtaining nickel-based metal hydroxide particle in the second coprecipitation step; and obtaining nickel-based lithium metal oxide particle doped with Zr and Al by sintering a mixture of the nickel-based metal hydroxide particle, a lithium source material, a Zr supply material, and a Al supply material after the second coprecipitation step.

This is after the precursor having the above-described CSG type (i.e., the nickel-based metal hydroxide particle) is produced, and the lithium source material and the dopant supply material are mixed with that and sintered to produce nickel-based lithium metal oxide particles doped with Zr and Al. Accordingly, the finally obtained material is a cathode active material including the nickel-based lithium metal oxide particles having the CSG shape and simultaneously doped with Zr and Al.

Meanwhile, in the method for producing a cathode active material provided in an embodiment of the present invention, it is easy to appropriately control the particle size of the finally obtained particles by properly controlling the first coprecipitation step and the second coprecipitation step.

When the first coprecipitation step is performed for 10 hours or more and the second coprecipitation step is performed for about 20 hours, large-particles may be prepared. Further, when the first coprecipitation step is performed for less than 10 hours and 6 hours or more, and the second coprecipitation step is performed for about 15 hours, small-particles can be produced.

Furthermore, by suitably mixing the prepared large-particles and small-particles, they can be the bi-modal cathode active materials described above.

Hereinafter, a method of manufacturing a cathode active material according to an embodiment of the present invention will be described in detail, but a description overlapping with those described above will be omitted.

Combination of Coprecipitation Raw Material

Specifically, the molar ratio of the Zr supplying material: Al supplying material in the mixture of the nickel-based metal hydroxide particles, the lithium source material, the Zr supplying material, and the Al supplying material may be controlled to be 15:1 to 0.4:1.

More specific amounts of the Zr supply material and the Al supply material may be determined in consideration of the doping amount in the final cathode active material.

Co-Precipitation Process

Generally, nickel-based metal hydroxide particles having a concentration gradient are prepared by coprecipitation using a batch type reactor.

According to this, as compared with the case of using a continuous stirred tank reactor (CSTR), a plurality of nickel-based metal hydroxide particles having a narrow Gaussian distribution are produced.

Nevertheless, the plural nickel-based metal hydroxide particles prepared to have a concentration gradient using the above-mentioned batch type reactor have a problem in related to a change of an internal composition (an average molar content of nickel, a shape of a concentration gradient, etc.) by each particle size.

This problem is exacerbated when the nickel-based metal hydroxide particles having a large size are produced, and the internal composition of the large-particle is uneven by particle size, resulting in the restriction of the implementation of the bimodal active material.

More specifically, the core portion can be formed by supplying the first metal salt aqueous solution at a constant rate to a batch-type reactor in which the pH is kept constant and the chelating agent is supplied. A second coprecipitation step of gradually decreasing the supply rate of the first metal salt aqueous solution and gradually increasing the supply rate of the second metal salt aqueous solution after the first coprecipitation step, resulting forming the shell portion on the surface of the core portion;

This is referred to as "a second coprecipitation step", and a plurality of nickel-based metal hydroxide particles having a Gaussian distribution of the particle diameter can be obtained, and each particle can have the form of CSG.

The first coprecipitation step is performed for about 5 hours, and the total execution time of the first coprecipitation step and the second coprecipitation step is performed for about 20 hours, so that the value of the equation 1 is less than 50% of nickel-based metal hydroxide particles. In this case, it is pointed out that there is a problem that the internal composition (the average molar content of nickel, the shape of the concentration gradient, etc.) varies depending on the connection in series of the supply tanks of the metal salt aqueous solution.

On the other hand, by controlling the first coprecipitation step and the second coprecipitation step so that the value of the following equation 1 for the nickel-based metal hydroxide particles is 50% or more, finally the value of equation 1 of nickel-based lithium metal oxide particle can also be 50% or more. The core portion and the shell portion length of the desired nickel-based lithium metal oxide particle and the nickel-based metal hydroxide particle as a precursor thereof correspond to each other.

$$R1/(R1+D1)*100\%$$ [Equation 1]

In the above equation 1, R1 is the radius of a core portion in the nickel-based metal hydroxide particle, and D1 is the thickness of a shell portion in the nickel-based metal hydroxide particle.

In this case, even if relatively large nickel-based metal hydroxide particles as well as nickel-based metal hydroxide particles having a relatively small size are prepared by using the supply tanks connected in series, the internal composition (the average molar content of nickel, the concentration gradient, and the like) can be made uniform.

More specifically, the execution time of the first coprecipitation step and the execution time of the second coprecipitation step may be set such that the value of the above-described equation 3 is 50% or more, specifically 60% or more, 70% or more, and can be suitably controlled to be 75% or more as in the example.

Meanwhile, the execution time of the first coprecipitation step is proportional to the radius R1 of the core part, and the forming time of the shell part may be proportional to the thickness D1 of the shell part. In this regard, the first coprecipitation step and the second coprecipitation step can be controlled to satisfy the following equation 2.

$$\log(T1)/\log(T1+T2) \approx R1/(R1+D1)$$ [Equation 2]

In the above equation 2, T1 is the execution time of the first coprecipitation step, and T2 is the execution time of the second coprecipitation step.

The above first coprecipitation step and the second coprecipitation step can be controlled so as to satisfy the above-described Equation 1 and Equation 2 even when preparing the above-described large-particles and small-particles. Thus, it is advantageous to produce a large-sized active material in which the internal composition (average molar content of nickel, shape of concentration gradient, etc.) of each particle size is uniformly controlled.

Co-Precipitation Raw Material

Meanwhile, the first metal salt aqueous solution used in the first coprecipitation step may be a mixture of a nickel raw material, a dissimilar metal raw material, and water so as to satisfy the stoichiometric molar ratio of the above-described formula 2.

The nickel raw material is not particularly limited as long as it is a substance in which nickel cations and certain anions are ionically bonded and dissolved in water to dissociate into cations and anions.

The dissimilar metal raw material is not particularly limited as long as it may be a substance in which a metal cation other than nickel (for example, a cation such as Mn, Co, Al) and an optional anion are ionically bonded, and which is dissolved in water and dissociated into a cation and an anion. For example, at least one of Co raw material, Mn raw material, Al raw material, Mg raw material, Zr raw material, Sn raw material, Ca raw material, Ge raw material and Ga raw material.

The second metal salt aqueous solution used in the second coprecipitation step may be a mixture of a nickel raw material, a dissimilar metal raw material, and water so as to satisfy the stoichiometric molar ratio of the above-described formula 3.

The nickel raw material and the dissimilar metal raw material are as described above.

Size of Co-Precipitated Product (Nickel-Based Metal Hydroxide Particle)

The nickel-based metal hydroxide particles, which are the coprecipitation product, may be particles of a large-diameter precursor having a D50 particle size of from 10 μm to 30 μm, more specifically from 10 μm to 18 μm, in order to realize a large-sized active material and a bimodal active material based thereon.

The nickel-based metal hydroxide particle as the coprecipitation product may be a small particle size precursor particle having a D50 particle size of 1 μm to 6 μm in order to realize a small-particle size active material and a bimodal active material based thereon.

Co-Precipitated Product (Nickel-Based Metal Hydroxide Particle) Internal Composition The nickel-based metal hydroxide particles as the coprecipitation product may have an average composition represented by the following formula 1 by each particle size, for example, by D50 particle size.

$$Ni_{1-w1-x1}Co_{w1}M1_{x1}(OH)_{2-p1}X_{p1}$$ [Formula 1]

In the formula 1, M1 is selected from the group consisting of Mn, Al, Mg, Zr, Sn, Ca, Ge, Ga, B, Mo and Nb, X is selected from the group consisting of F, N, and P, w1, x1, and p1 is, each $0<w1\leq0.2$, $0<x1\leq0.2$, and $0\leq p1\leq0.1$.

This means that the molar content of nickel is at a high concentration of not less than 60% in the entire region of the nickel-based metal hydroxide particles composed of the core portion and the shell portion.

For example, in the formula 1, M1 is Mn, $0<w1\leq0.1$, and $0<x1\leq0.1$.

More specifically, the nickel-based metal hydroxide particles as the coprecipitation product may have a core portion composition represented by the following formula 2 by each particle size, for example, by D50 particle size.

$$Ni_{1-w2-x2}Co_{w2}M1_{x2}(OH)_{2-p2}X_{p2}$$ [Formula 2]

In the formula 2, M1 is selected from the group of Mn, Al, Mg, Zr, Sn, Ca, Ge, Ga, B, Mo, and Nb, X is selected from the group of F, N, an P, w2, x2, and p2 is, each $0\leq w2\leq0.1$, $0\leq x2\leq0.1$, and $0\leq p2\leq0.05$.

This means that the molar content of nickel in the entire region of the core portion in the nickel-based metal hydroxide particle is 80% or more, which is higher than the average composition.

For example, in Formula 2, M1 is Mn, $0<w2\leq0.05$, and $0, 0<x2\leq0.05$.

The nickel-based metal hydroxide particles as the coprecipitation product are represented by the formula 2 at the interface with the core portion, for example, by D50 particle size, and the formula 3 at the outermost portion. The each molar content of nickel (Ni), M1, M2 and M3 may gradually change from the interface to the outermost portion.

$$Ni_{1-w3-x3}Co_{w3}M1_{x3}(OH)_{2-p3}X_{p3}$$ [Formula 3]

In the formula 3, M1 is selected from the group consisting of Mn, Al, Mg, Zr, Sn, Ca, Ge, Ga, B, Mo, and Nb, X is selected from the group consisting of F, N, and P, w3, x3, and p3 is each $0<w3\leq0.3$, $0<x3\leq0.3$, and $0\leq p3\leq0.1$.

This means that the molar content of nickel is at least 80% at the interface with the core portion in the nickel-based metal hydroxide particle as the coprecipitation product, and the molar content of nickel at the outermost portion is at least 60%. In addition, the molar content of nickel is gradually decreased from the interface to the outermost portion. More specifically, the nickel molar content at the interface of the core portion and the shell portion may be 85% to 100%, or 88% to 99%. In addition, the outermost portion of the shell, i.e., the nickel mole content at the surface, may be 55% to 88%, 58% to 83%, or 60% to 78%. In addition, the metals other than nickel (i.e., M1, M2, and M3) have a concentration gradient in which the molar content gradually increases from the interface to the outermost periphery.

For example, in Formula 3, M1 is Mn, $0<w3\leq0.25$, and 0.25, and $0<x3\leq0.25$.

The nickel-based metal hydroxide particles may have a stable structure according to the composition of the shell portion of Formula 3 while exhibiting a high capacity according to the total composition of Formula 1 and the core portion of Formula 2.

Sintering Process

The sintering temperature may be 700 to 800° C., and the sintering time may be 12 to 20 hours.

The step of obtaining nickel-based lithium metal oxide particle doped with Zr and Al by sintering a mixture of the nickel-based metal hydroxide particle, a lithium source material, a Zr supply material, and a Al supply material after the second coprecipitation step comprises: a first sintering step of sintering in a temperature range of 400 to 600° C.; a temperature raising step of raising the temperature at a rate of 3 to 7° C./min; and a second sintering step of sintering in a temperature range of 700 to 800° C.

Sintering Step (Step of Obtaining Nickel-Based Lithium Metal Oxide Particles)

After the second coprecipitation step, the mixture of the nickel-based metal hydroxide particles and the lithium source material is sintered to obtain nickel-based lithium metal oxide particles.

At this time, as mentioned above, a doping raw material can be added to the mixture, and the obtained nickel-based lithium metal oxide particle includes a dopant.

Coating Layer Formation Step

A step of forming a coating layer surrounding the outer surface of the nickel-based lithium metal oxide particle may be further included, after the step of obtaining the nickel-based lithium metal oxide particle, The step of forming a coating layer surrounding the outer surface of the nickel-based lithium metal oxide particle can include: mixing the nickel-based lithium metal oxide particle and a coating source material; and heating the mixture of the nickel-based lithium metal oxide particle and the coating source material.

The coating source material may be an element selected from the group consisting of B, Mg, Zr, Al, Mn, Co, or a combination thereof, an oxide of the element, an amorphous compound, a lithium ion conductive oxide (e.g., lithium borate, Lithium borosilicate), polymers, and the like. The step of mixing the nickel-based lithium metal oxide particles and the coating source material is not limited to dry mixing or wet mixing.

Lithium Secondary Battery

In another embodiment of the present invention, there is provided a cathode comprising a cathode active material for a lithium secondary battery as described above; anode; and an electrolyte.

This corresponds to a lithium secondary battery which exhibits excellent performance by including the above-described cathode active material. Since the cathode active material has already been described in detail, a detailed description will be omitted.

The structure of the lithium secondary battery excluding the positive electrode active material is generally known.

BEST MODE

Hereinafter, preferred examples and experimental examples of the present invention will be described. However, the following examples are only a preferred embodiment of the present invention, and the present invention is not limited to the following examples.

Production Example 1 (Large-Particle Cathode Active Material Precursor)

1) Preparation of Metal Salt Solution

First, two metal aqueous solutions having different Ni, Co, and Mn concentrations were prepared by using $NiSO_4 \cdot 6H_2O$ as a raw material of nickel, $CoSO_4 \cdot 7H_2O$ as a raw material of cobalt, and $MnSO_4 \cdot H_2O$ as a raw material of manganese.

The first metal salt aqueous solution for forming the core portion is prepared by mixing the respective raw materials so as to satisfy the stoichiometric molar ratio of $(Ni_{0.98}Co_{0.01}Mn_{0.01})(OH)_2$ in distilled water, wherein the molar concentration of the whole metal salt is 2.5 M.

Independently, the second metal salt aqueous solution for forming the shell portion is prepared by mixing the respective raw materials so as to satisfy the stoichiometric molar ratio of $(Ni_{0.64}Co_{0.23}Mn_{0.13})(OH)_2$ in distilled water, wherein the molar concentration of the whole metal salt is 2.5 M.

2) Co-Precipitation Process

A coprecipitation reactor in which two metal salt aqueous solution supply tanks are connected in series is prepared and the first metal salt aqueous solution and the second metal salt aqueous solution are charged into respective metal salt aqueous solution supply tanks.

3 liters of distilled water was placed in the coprecipitation reactor (capacity 20 L, output of the rotary motor 200 W), nitrogen gas was supplied at a rate of 2 liters/min to remove dissolved oxygen, and the temperature of the reactor. Then the reactor was stirred at 140 rpm while maintaining the temperature at 50° C.

In addition, $NH_4(OH)$ at a concentration of 14 M was fed at 0.06 liter/hour as a chelating agent, and an 8 M NaOH solution at a rate of 0.1 liter/hour as a pH regulator was continuously fed into the reactor. At this time, the amount thereof was appropriately controlled so as to be maintained at pH 12.

In the reactor in which the pH was kept constant and the chelating agent was supplied, the charging time and the amount of each metal salt solution were controlled from the two metal salt aqueous solution supply tanks connected in series.

Specifically, the impregnation rate of the reactor was adjusted to 140 rpm while introducing the first metal salt aqueous solution at 0.4 liter/hour, and the coprecipitation reaction was performed until the diameter of the precipitate became about 11.1 μm. At this time, the flow rate was adjusted so that the average residence time of the solution in the reactor was about 10 hours. After the reaction reached a steady state, the steady state duration was given to the reactant to obtain a denser coprecipitated compound.

Subsequently, the total feed solution was fed at 0.4 liter/hour while changing the mixing ratio of the first metal salt aqueous solution and the second metal salt aqueous solution, the feed rate of the first metal salt aqueous solution was gradually decreased to 0.05 liter/hour, and the feed rate of the second metal salt aqueous solution was gradually increased to 0.35 liter/hour. At this time, the average residence time of the solution in the reactor was adjusted to 20 hours or less by controlling the flow rate, and finally the coprecipitation reaction was performed until the diameter of the precipitate became 14.8 μm.

3) Post-Treatment Process

The precipitate obtained by the series of coprecipitation steps was filtered, washed with water, and then dried in an oven at 100° C. for 24 hours to prepare active material precursor particles.

In the active material precursor particles prepared as described above, up to a radius of 75% is the core portion and the outer part constitutes the shell portion. At this time, the average composition of the core portion was $Ni_{0.98}Co_{0.01}Mn_{0.01}$, and the molar content of Ni gradually decreased from the interface between the core portion and the shell portion, so that the surface portion of the shell portion had a concentration gradient of $Ni_{0.64}Co_{0.23}Mn_{0.13}$.

As a result, a plurality of large-diameter particles having a composition of $(Ni_{0.88}Co_{0.095}Mn_{0.025})(OH)_2$ in the whole particles were obtained as the active material precursor of Example 1.

Production Example 2 (Small Size Cathode Active Material Precursor)

1) Preparation of Metal Salt Solution

A first aqueous metal salt solution and a second aqueous metal salt solution as in Production Example 1 were prepared.

2) Co-Precipitation Process

Using the same reactor as in Production Example 1, the other conditions were the same and the charging time and charging amount of each metal salt solution were varied.

Specifically, the impregnation rate of the reactor was adjusted to 140 rpm while introducing the first metal salt aqueous solution at a rate of 0.4 liter/hour, and a coprecipitation reaction was performed until the diameter of the precipitate became approximately 3.8 to 4.5 μm. At this time, the flow rate was adjusted so that the average residence time of the solution in the reactor was about 10 hours. After the reaction reached a steady state, the steady state duration was given to the reactant to obtain a denser coprecipitated compound.

Subsequently, the total feed solution was fed at 0.4 liter/hour while changing the mixing ratio of the first metal salt aqueous solution and the second metal salt aqueous solution, the feed rate of the first metal salt aqueous solution was gradually decreased to 0.05 liter/hour, and the feed rate of the second metal salt aqueous solution was gradually increased to 0.35 liter/hour. At this time, the average residence time of the solution in the reactor was controlled to be within 15 hours by adjusting the flow rate, and the coprecipitation reaction was performed until the diameter of the precipitate finally reached 5.3 μm.

3) Post-Treatment Process

The precipitate obtained according to the series of coprecipitation steps was filtered, washed with water, and then dried in an oven at 100° C. for 24 hours to obtain a composition $(Ni_{0.88}Co_{0.095}Mn_{0.025})(OH)_2$ was obtained as an active material precursor of Production Example 2.

Example 1 (a Large-Particle, Simultaneous Doping of Cathode Active Material, Zr and Al)

1) Sintering Process

Lithium salts LiOH.H$_2$O (Samjun Chem, battery grade), doping raw materials ZrO$_2$ (Aldrich, 4N) and Al(OH)$_3$ (Aldrich, 4N) were homogeneously mixed with the cathode active material precursor prepared in Preparation Example 1.

During the mixing, the molar ratio of the precursor:the lithium salt was 1:1.05, and the total amount of Zr was 3,400 ppm and the amount of Al was 140 ppm or 280 ppm.

The mixture was charged into a tube furnace (inner diameter: 50 mm, length: 1,000 mm) and heated while introducing oxygen at 200 mL/min.

The sintering temperature was maintained at 480° C. for 5 hours, and then maintained at 700 to 750° C. for 16 hours, and the heating rate was 5° C./min. Accordingly, a sintered body powder having a total composition of $Li_{1.05}(Ni_{0.88}Co_{0.095}Mn_{0.025})Zr_{0.0037}Al_{0.0005}O_2$ (Zr 3,400 ppm+Al 140 ppm) and $Li_{1.05}(Ni_{0.88}Co_{0.095}Mn_{0.025})Zr_{0.0037}Al_{0.001}O_2$ (Zr 3,400 ppm+Al 280 ppm) were independently obtained.

2) Coating Process

Each of the sintered powder and H$_3$BO$_3$ powder was dry mixed and then heat treated to uniformly coat B on the surface of each sintered body particle.

Finally, a plurality of large diameter particles coated with 800 ppm of B was obtained as the active material of Example 1 by each contents of the doping element.

Example 2 (Simultaneous Doping of a Cathode Active Material with a Small Particle Size, Zr and Al)

The cathode active material precursor used in Example 1 was replaced to obtain a cathode active material having a small particle size.

Specifically, the cathode active material precursor having a small particle size obtained in Production Example 2 was used in place of the charged electrode active material precursor obtained in Production Example 1. The remainder was the same as in Example 1.

Example 3 (Bimodal Cathode Active Material, Simultaneous Doping of Zr and Al)

1) Large-Particles Manufacturing Process

In Example 1, only the sintering process was carried out until the sintered large particle was obtained.

2) Small-Particles Manufacturing Process

In Example 2, only the sintering process was carried out until the sintered small particle was obtained.

3) Mixing and Sintering Process

The above-mentioned large-sized sintered body and the small-sized sintered body were mixed, and those having the same doping characteristics were mixed together. The weight ratio of the large body:the small body was 8:2.

After the sintering of the mixture, the surface residual lithium was removed by washing with water.

4) Coating Process

The material subjected to the mixing and heating processes was dry-mixed with $H_3BO_3$ and then heat-treated to uniformly coat B on the surface.

Comparative Example 1 (Large Cathode Active Material Precursor, Zr Doping Alone)

Of the two doping materials used in Example 1, only $ZrO_2$ (Aldrich, 4N) was used, and the rest was the same as in Example 1.

Thus, a plurality of large-diameter particles having a coating of 800 ppm of B on the surface of the particles having a composition of $Li_{1.05}(Ni_{0.88}Co_{0.095}Mn_{0.025})Zr_{0.0037}O_2$ (Zr 3,400 ppm) was obtained as an active material of Comparative Example 1.

Comparative Example 2 (Small Particle Cathode Active Material Precursor, Zr Doping Alone)

The cathode active material precursor used in Comparative Example 1 was replaced to obtain a cathode active material having a small particle size.

Specifically, the cathode active material precursor having a small particle size obtained in Production Example 2 was used in place of the charged electrode active material precursor obtained in Production Example 1. The rest were the same as those of Comparative Example 1.

Comparative Example 3 (Bimodal Cathode Active Material, Zr Doping Alone)

Instead of the two sintered bodies used in Example 3, the sintered bodies of Comparative Example 1 and Comparative Example 2 were used. The same procedure was followed as an Example 3 to obtain a bimodal cathode active material.

Evaluation Example 1 (Evaluation of Appearance of Cathode Active Material)

SEM photographs were analyzed to evaluate the change of cathode active material appearance depending on doping element and doping amount.

Specifically, for the large-sized electrode active material, when 3,400 ppm of Zr alone was doped (FIG. 1a), when Zr 3,400 ppm and B 140 ppm were simultaneously doped (FIG. 1b), when Zr 3,400 ppm and B 280 ppm were simultaneously doped (FIG. 1c) SEM photographs of each cathode active material were analyzed. When Zr alone is doped at 3,400 ppm, it can be confirmed that the shape of the primary particles is relatively similar to a cube.

On the other hand, in the case of simultaneous doping of Zr 3,400 ppm and Al 140 ppm, it can be confirmed that the shape of the primary particle is a rod shape similar to a rectangular parallelepiped.

Furthermore, in the case of simultaneous doping of Zr 3,400 ppm and B 280 ppm, the shape of the primary particles is rod-shaped similar to a rectangular parallelepiped. It can be seen that the size of the primary particles decreases and the shape becomes clearer as compared with the case where the amount of B doping is smaller.

Evaluation Example 2 (XRD Analysis)

For crystallographic examination by doping, the XRD was analyzed for the same subject as that of Evaluation Example 1.

Specifically, Rietveld analysis was performed using high score plus Rietveld software, and the results are shown in Table 1. However, for Rietveld analysis, the XRD measurement range is fitted using the results measured at 10° to 130°, and the result is a reliable value as the Goodness of Fit (GOF) value is calculated to be within 1.1.

TABLE 1

| Doping element and doping amount | a(Å) | b(Å) | Volume (Å) | Crystalline size (nm) | I(003)/I(104) | R-factor | GOF |
|---|---|---|---|---|---|---|---|
| Zr 3,400 ppm | 2.872 | 14.193 | 101.43 | 130.2 | 1.213 | 0.520 | 1.05 |
| Zr 3,400 ppm, and Al 140 ppm | 2.873 | 14.193 | 101.44 | 98.0 | 1.221 | 0.514 | 1.06 |
| Zr 3,400 ppm, and Al 280 ppm | 2.873 | 14.196 | 101.48 | 85.1 | 1.221 | 0.520 | 1.04 |

According to Table 1, when the Zr 3,400 ppm and Al 140 ppm were simultaneously doped, or when the Zr 3,400 ppm and Al 280 ppm were simultaneously doped, there is no significant change in the a-axis and c-axis crystal constants (lattice parameter), but it can be seen that as the doping amount of Al doped with Zr increases, the crystallization size decreases.

This is a result corresponding to the appearance evaluation result of the evaluation example 1. Specifically, when Al is doped with Zr, an active material having a reduced crystal size is obtained at the same sintering temperature as that of Zr single doping, thereby decreasing the primary particle size of the active material. The shape of the active material is not a cube, but it is controlled in a similar rod form.

Further, as the doping amount of Al doped with Zr is increased, the active material having a further reduced crystal size is obtained at the same sintering temperature, whereby the primary particle size of the active material is further reduced and the morphology thereof is more clearly controlled.

Evaluation Example 3 (PSD Analysis)

A particle size distribution (PSD) analysis was performed on a bi-modal type cathode active material mixed with large-particles and small-particles, and the results are shown in FIGS. 2a to 2c. [(a) Zr 3,400 ppm, (b) Zr 3,400 ppm+Al 140 ppm, (c) Zr 3,400 ppm+Al 280 ppm].

FIGS. 2b to 2c, it can be seen that a bi-modal shape is well formed because two main peaks are present.

Specifically, when 3,400 ppm of Zr alone is doped (FIG. 2a), the bimodal cathode active material has a $D_{min}$ of 2.52 μm, a D10 particle size of 4.71 μm, a D50 particle size of 12.41 μm, a D90 particle size of 18.38 μm, and a $D_{max}$ of 36.63 μm.

On the other hand, when the Zr 3,400 ppm and Al 140 ppm are simultaneously doped, the bimodal cathode active material has a $D_{min}$ of 2.52 μm, a D10 particle size of 4.77 μm, a D50 particle size of 12.41 μm, a D90 particle size of 18.29 μm, and a $D_{max}$ of 36.65 μm.

When the Zr 3,400 ppm and Al 280 ppm were simultaneously doped, the bimodal cathode active material had a Dmin of 2.52 μm, a D10 of 4.99 μm, a D50 particle size of 12.57 μm, a D90 particle size of 18.24 μm and a $D_{max}$ of 31.11 μm.

Evaluation Example 4 (Evaluation of Battery Characteristics)

The electrochemical characteristics of the cells to which each of the cathode active materials of Example 3 and Comparative Example 3 were applied were evaluated. Specifically, each battery was manufactured according to the following process.

(1) Manufacture of Batteries

PVDF (Polyvinylidene fluoride, KF1100) as a binder and Denka black (trade name: super p) as a conductive material were mixed in a ratio of 92.5:3.5:4 (active material:binder: conductive material) to each of the cathode active materials of Example 3 and Comparative Example 3, and NMP (N-Methyl-2-pyrrolidone) was added to adjust the slurry viscosity.

The slurry was coated on an Al foil (thickness: 15 μm) using a doctor blade, dried and rolled to obtain an cathode. The loading amount of the electrode was 14.6 mg/cm².

As the electrolytic solution, 1.5 vol % of VC was added to 1M $LiPF_6$ in EC:DMC:EMC=3:4:3 (vol %). A 2032 half-cell was fabricated using the cathode, the electrolytic solution, a PP separator and a lithium anode (200 μm, Honzo metal) according to a conventional manufacturing method. After aging at room temperature for 10 hours, charge and discharge tests were carried out.

(2) Evaluation Condition

For each cell, various properties were evaluated under the following conditions.

215 mAh/g was used as the reference capacity, and charge/discharge conditions of CC/CV 2.5~4.25V, 1/20 C cut-off were applied Initial Capacity Evaluation: 0.1C charge/0.1C discharge followed by 0.2C charge/0.2C discharge.

When evaluating the output characteristics, increase the C-rate at 0.1C, 0.2C, 0.5C, 1C, 1.3C, and 2 C and measure the discharge capacity Evaluation of high-temperature cycle life characteristics: Charge-discharge cycle 30 times under the condition of 0.3C charge/0.3C discharge in the high temperature (45° C.), at 4.25 V~2.5 V potential range High-temperature DC-iR evaluation: The charge/discharge cycle is carried out at a high temperature (45° C.), and the voltage is measured 60 seconds after the discharge current is applied at 100%

(3) Evaluation Results

The evaluation results for each cell are shown in FIGS. 3 to 6.

Specifically, FIG. 3 shows the results of evaluating the initial charge/discharge capacity, and it can be confirmed that both Example 3 and Comparative Example 3 exhibited an initial charge capacity of 236.5 mAh/g, an initial discharge capacity of 215 mAh/g, and an efficiency of 91%. Therefore, it can be seen that the simultaneous doping of Zr and Al and the doping of Zr alone have the same level of capacity.

Meanwhile, FIG. 4 is a result of increasing the C-rate and evaluating the output characteristics. It can be seen that the characteristics are improved when Zr and Al are simultaneously doped, compared with the case where Zr is doped alone. Further, even when Zr and Al are simultaneously doped, the output characteristic is further improved when the doping amount of Al is increased. Specifically, at the 2C-rate, a capacity retention rate of 87.1% was obtained when the Zr 3,400 ppm and Al 280 ppm were simultaneously doped, and a capacity retention rate of 86.2% was obtained when the Zr 3,400 pmm was doped singly. There was 1% difference in output characteristics.

FIG. 5 shows the results of evaluating the charge/discharge life at high temperature. When Zr alone was doped, the capacity maintenance ratio was 93.9% after 30 cycles, while the capacity maintenance ratio increased to 94.7% when Zr 3,400 ppm and Al 140 ppm were simultaneously doped, and when Zr 3,400 ppm, and Al 280 ppm were simultaneously doped, the capacity maintenance ratio increased to 95.9%.

FIG. 6 shows the result of measuring the DCR increase rate while evaluating the charge/discharge life at high temperature. In the case of Zr alone doping, the resistance increase rate is 140% after 30 cycles, whereas when the simultaneous doping of Zr and Al, it can be seen to decrease the increase rate of resistance.

Evaluation Example 5 (Cross-Sectional Evaluation of Cathode Active Material)

In Example 1, the cross-section of a large-sized active material prepared by simultaneously doping 3,400 ppm of Zr and 140 ppm of Al was cut using a forced ion beam (FIB), and then the metal concentration distribution of the core portion and the shell portion was measured. The distribution of metal concentrations was determined by energy dispersive x-ray spectrometry (EDS).

The results are shown in FIG. 7.

Referring FIG. 7, when the lithium source, Zr and Al are simultaneously doped and sintered as in Example 1, it can be seen that the difference in metal ion concentration between the core portion and the shell portion is reduced due to the diffusion of each metal ion.

The concentration distribution of the metal ions from the center of the core portion to the surface of the shell portion in the cross section of the cathode active material of large particle size shows that the core portion has a molar content of Ni of at least 90.8% and a minimum of 88.2%. The shell portion located after 75% radius in the cathode active material particle has a concentration gradient of Ni ion, and the Ni mole content of the surface of the shell portion is 84.2%. As a result, in comparison with $Ni_{0.88}Co_{0.095}Mn_{0.025}$, which is an average composition of the large-sized active material prepared by simultaneously doping 3,400 ppm of Zr and 140 ppm of Al in Example 1, the composition of the surface of the shell portion was $Ni_{0.84}Co_{0.12}Mn_{0.04}$. Accordingly, the structural stability of the cathode active material is increased.

Evaluation Example 6 (DSC Measurement Result)

The thermal stability of differential scanning calorimeter (DSC) was measured for the large-sized particles prepared in Example 1 and Comparative Example 1. DSC evaluation was carried out using Mettler Toledo's Au-plated HP cell (15 MPa), and the results are shown in Table 2.

Specifically, the electrolytic solution (mass ratio of the cathode active material:the electrolytic solution=1:2) was added to the cathode active material prepared in Example 1 and Comparative Example 1, and DSC evaluation was carried out. The measurement range was 150° C. to 350° C.

TABLE 2

| division | Comparative Example 1 Zr 3,400 ppm | Example 1 Zr3,400 ppm + Al 140 ppm | Example 1 Zr3,400 ppm + Al 280 ppm |
|---|---|---|---|
| Onset [° C.] | 208.4 | 216 | 218 |
| Peak [° C.] | 222 | 222 | 224 |
| Calorific value [J/g] | 1,703 | 1,679 | 1,225 |

Referring to Table 2, in the case of single doping of Zr as in Comparative Example 1, the on-set temperature was 208.4° C. and the exothermic peak temperature was 222° C. On the contrary, when Zr and Al are simultaneously doped as an Example 1, it can be confirmed that both the crystallization onset temperature and the exothermic peak temperature are both increased.

Also, as an Example 1, when the Zr and Al are simultaneously doped, the calorific value (J/g) is also decreased. As a result, the cathode active material according to the embodiments is excellent in terms of thermal stability.

Evaluation Example 7 (TEM Measurement Result)

FIG. 8 shows a transmission electron microscope (TEM) image of the shell portion of the large-sized active material prepared by simultaneously doping 3,400 ppm of Zr and 140 ppm of Al in Example 1.

Referring to FIG. 8, it can be confirmed that the primary particle shape of the shell portion is a rod shape having an aspect ratio of 1 or more. The shape of primary particles was 0.5 μm in short axis and 2 μm in long axis.

These rod-shaped primary particles in the shell portion move lithium ions directly into the layered structure from the surface, thereby increasing the charge/discharge characteristics.

It will be understood by those skilled in the art that various changes in form and details may be made therein without departing from the spirit and scope of the present invention as defined by the following claims. It is therefore to be understood that the above-described embodiments are illustrative in all aspects and not restrictive.

The invention claimed is:

1. A cathode active material for a lithium secondary battery, comprising:
    a nickel-based lithium metal oxide particle doped with Zr and Al,
    wherein, the nickel-based lithium metal oxide particle comprises:
        a core portion having a constant molar content of nickel; and
        a shell portion surrounding an outer surface of the core portion and having a concentration gradient in which a molar content of nickel gradually decreases in a direction from an interface with the core portion to an outermost periphery,
    wherein the core portion and the shell portion are doped with Al and Zr, and
    wherein an average composition of the nickel-based lithium metal oxide particles is represented by the following formula 4:

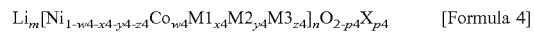 [Formula 4]

$Li_m[Ni_{1-w4-x4-y4-z4}Co_{w4}M1_{x4}M2_{y4}M3_{z4}]_nO_{2-p4}X_{p4}$ [Formula 4]

in the formula 4:
        M1 is selected from the group consisting of Mn, Mg, Sn, Ca, Ge, Ga, B, Mo, and
        M2 is Zr,
        M3 is Al,
        X is selected from the group consisting of F, N, and P,
        w4, x4, y4, z4, and p4 meet 0<w4≤0.2, 0<x4≤0.2, 0<y4≤0.006, 0<z4≤0.006, 0<w4+x4+y4+z4≤0.4, and 0≤p4≤0.1,
        m is 0.95≤m≤1.1, and
        n is 0.95≤n≤1.1.

2. The cathode active material of claim 1, wherein a molar ratio of Zr:Al in the nickel-based lithium metal oxide particle is 15:1 to 0:4:1.

3. The cathode active material of claim 1, wherein a doping amount of Zr in the nickel-based lithium metal oxide particle is 2,000 to 5,000 ppm.

4. The cathode active material of claim 1, wherein an amount of Al doped in the nickel-based lithium metal oxide particle is 100 to 1,500 ppm.

5. The cathode active material of claim 1, wherein the nickel-based lithium metal oxide particle has a primary particle shape in the form of a rod.

6. The cathode active material of claim 5, wherein the nickel-based lithium metal oxide particle is a large-particle having a D50 diameter of 10 to 30 μm, and has a lattice parameter of an axis from 2.85 to 2.88 Å.

7. The cathode active material of claim 5, wherein the nickel-based lithium metal oxide particle is a large-particle having a D50 diameter of 10 to 30 μm, and has a lattice parameter of c axis from 14.13 to 14.37 Å.

8. The cathode active material of claim 5, wherein the nickel-based lithium metal oxide particle has a crystallite size of 60 nm to 200 nm.

9. The cathode active material of claim 1, wherein the nickel-based lithium metal oxide particles are plural and a mixture of two kinds of the nickel-based lithium metal oxide particles having different particle diameters.

10. The cathode active material of claim 9, wherein the mixture comprises a large-particle having a D50 diameter of 10 to 30 μm and a small-particle having a D50 particle size of 1 to 6 μm.

11. The cathode active material of claim 10, wherein the weight ratio of the large-particles: the small-particles is in a range of 50:50 to 90:10.

12. The cathode active material of claim 1, wherein the nickel-based lithium metal oxide particle has 50% or more of a value of the follow equation 3:

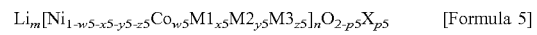

R2/(R2+D2)*100% [Equation 3]

in the equation 3, R2 is a radius of the core portion in the nickel-based metal oxide particle, and D2 is a thickness of the shell portion in the nickel-based metal oxide particle.

13. The cathode active material of claim 1, wherein the core portion composition of the nickel-based lithium metal oxide particle is represented by the following formula 5:

$Li_m[Ni_{1-w5-x5-y5-z5}Co_{w5}M1_{x5}M2_{y5}M3_{z5}]_nO_{2-p5}X_{p5}$ [Formula 5]

in the formula 5:
    M1 is selected from the group consisting of Mn, Mg, Sn, Ca, Ge, Ga, B, Mo, and
    M2 is Zr,
    M3 is Al,
    X is selected from the group consisting of F, N, and P, w5, x5, y5, z5, and p5 meet $0 \leq w5 \leq 0.1$, $0 \leq x5 \leq 0.1$, $0 < y5 \leq 0.005$, $0 < z5 \leq 0.006$, $0 \leq w5+x5+y5+z5 \leq 0.2$, and $0 \leq p5 \leq 0.1$, m is $0.95 \leq m \leq 1.1$, and n is $0.95 \leq n \leq 1.1$.

14. The cathode active material of claim 13, wherein, the shell portion of the nickel-based lithium metal oxide particle is represented by the following formula 5 at the interface, and the following formula 6 at the outermost periphery, and a molar content of Ni, M1, M2, and M3 is gradually changed from the interface to the outermost periphery $$Li_m[Ni_{1-w6-x6-y6-z6}Co_{w6}M1_{x6}M2_{y6}M3_{z6}]_nO_{2-p6}X_{p6} \quad \text{[Formula 6]}$$

in the formula 6:

M1 is selected from the group consisting of Mn, Mg, Sn, Ca, Ge, Ga, B, Mo, and

M2 is Zr,

M3 is Al,

X is selected from the group of F, N, and P, w6, x6, y6, z6, and p6 meets $0 < w6 \leq 0.3$, $0 < x6 \leq 0.3$, $0 < y6 \leq 0.007$, $0 < z6 \leq 0.006$, $0 < w6+x6+y6+z6 \leq 0.5$, and $0 \leq p6 \leq 0.1$, m is $0.95 \leq m \leq 1.1$, and n is $0.95 \leq n \leq 1.1$.

15. The cathode active material of claim 1, wherein the nickel-based lithium metal oxide particle has 75% or more of a value of the follow equation 3.

16. The cathode active material of claim 1, further comprising:

a coating layer which surrounds an outer surface of the shell portion and contains at least one of an element which is B, Mg, Zr, Al, Mn, Co or a combination thereof, an oxide of the element, an amorphous compound, a lithium ion conductive oxide and polymer.

17. A method for producing cathode active material for lithium secondary battery, comprising:

preparing a first metal salt aqueous solution and a second metal salt aqueous solution each containing a nickel source material, a dissimilar metal source material, and water, and molar concentrations of the nickel source material being different from each other;

a first coprecipitation step of supplying the first metal salt aqueous solution at a constant rate to a reactor in which pH is kept constant and a chelating agent is supplied;

a second coprecipitation step of gradually decreasing the supply rate of the first metal salt aqueous solution and gradually increasing the supply rate of the second metal salt aqueous solution after the first coprecipitation step;

obtaining nickel-based metal hydroxide particles in the second coprecipitation step; and obtaining nickel-based lithium metal oxide particles doped with Zr and Al by sintering a mixture of the nickel-based metal hydroxide particles, a lithium source material, a Zr supply material, and an Al supply material after the second coprecipitation step, wherein an average composition of the nickel-based lithium metal oxide particles is represented by the following formula 4:

$$Li_m[Ni_{1-w4-x4-y4-z4}Co_{w4}M1_{x4}M2_{y4}M3_{z4}]_nO_{2-p4}X_{p4} \quad \text{[Formula 4]}$$

in the formula 4:

M1 is selected from the group consisting of Mn, Mg, Sn, Ca, Ge, Ga, B, Mo, and

M2 is Zr

M3 is Al,

X is selected from the group consisting of F, N, and P, w4, x4, y4, z4, and p4 is respectively, $0 < w4 \leq 0.2$, $0 < x4 \leq 0.2$, $0 < y4 \leq 0.006$, $0 < z4 \leq 0.006$, $0 < w4+x4+y4+z4 \leq 0.4$, and $0 \leq p4 \leq 0.1$, m is $0.95 \leq m \leq 1.1$, and n is $0.95 \leq n \leq 1.1$.

18. The method of claim 17, wherein the first coprecipitation step and the second coprecipitation step are controlled so that a value of the following equation 1 for the obtained nickel-based metal hydroxide particle is not less than 50%:

$$R1/(R1+D1)*100\% \quad \text{[Equation 1]}$$

in the above equation 1, R1 is a radius of a core portion in the nickel-based metal hydroxide particle, and D1 is a thickness of a shell portion in the nickel-based metal hydroxide particle.

19. The method of claim 18, wherein the first coprecipitation step and the second coprecipitation step are controlled so as to satisfy the following equation 2:

$$\log(T1)/\log(T1+T2) \approx R1/(R1+D1) \quad \text{[Equation 2]}$$

in the above equation 2, T1 is an execution time of the first coprecipitation step, and T2 is an execution time of the second coprecipitation step.

* * * * *